(12) United States Patent
Romana et al.

(10) Patent No.: US 11,555,440 B2
(45) Date of Patent: Jan. 17, 2023

(54) PRESSURIZED AIR INDUCTION SYSTEM

(71) Applicant: Ford Global Technologies, LLC, Dearborn, MI (US)

(72) Inventors: Jagjit Romana, NorthVille, MI (US); Kyle Ebner, Pinckney, MI (US); Chris P. Roxin, West Bloomfield, MI (US); Oliver Martinovski, Shelby Township, MI (US); Jacquita McKinney, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/451,623

(22) Filed: Oct. 20, 2021

(65) Prior Publication Data

US 2022/0042447 A1 Feb. 10, 2022

Related U.S. Application Data

(60) Continuation-in-part of application No. 16/803,357, filed on Feb. 27, 2020, now Pat. No. 11,193,415, which is a division of application No. 15/826,401, filed on Nov. 29, 2017, now Pat. No. 10,612,455.

(51) Int. Cl.
*F02B 29/04* (2006.01)
*F02D 41/00* (2006.01)
(Continued)

(52) U.S. Cl.
CPC ...... *F02B 29/0418* (2013.01); *F02B 29/0462* (2013.01); *F02D 11/106* (2013.01);
(Continued)

(58) Field of Classification Search
CPC ...... F02D 9/02; F02D 11/106; F02D 41/0005; F02D 41/0007; F02D 41/10;
(Continued)

(56) References Cited

U.S. PATENT DOCUMENTS 4,900,343 A 2/1990 Minami et al.
6,561,169 B2 5/2003 Sealy et al.
(Continued)

FOREIGN PATENT DOCUMENTS

WO 2005024202 A1 3/2005

*Primary Examiner* — John Kwon
*Assistant Examiner* — Johnny H Hoang
(74) *Attorney, Agent, or Firm* — Vincent Mastrogiacomo; McCoy Russell LLP

(57) ABSTRACT

Methods and systems are provided for boosted engines. In one example, a method for a boosted engine method may include storing compressed air in a reservoir for supply to the engine during increased engine load operating conditions and replenishing the air in response to pressure dropping below a nominal threshold; and increasing the pressure beyond the nominal threshold in response to increased temperature of the stored air in the reservoir even when operating conditions include decreased engine load, and purging the increased temperature stored air to bring pressure back down toward the nominal threshold. In one example, increasing pressure to the reservoir may include supplying compressed air from an air suspension system. In one example, increasing pressure to the reservoir may include supplying compressed air from an air compressor separate from an engine turbocharger compressor. In one example, the method may include, in response to a vehicle operator tip-in during the increasing of the pressure beyond the nominal threshold, simultaneously supplying stored compressed air to the engine while replenishing the air.

18 Claims, 8 Drawing Sheets

(51) Int. Cl.
*F02D 41/10* (2006.01)
*F02D 11/10* (2006.01)
*F02D 9/02* (2006.01)

(52) U.S. Cl.
CPC ..... *F02D 41/0005* (2013.01); *F02D 41/0007* (2013.01); *F02D 41/10* (2013.01); *F02D 9/02* (2013.01); *F02D 41/107* (2013.01); *F02D 2200/1002* (2013.01)

(58) Field of Classification Search
CPC ........... F02D 41/107; F02D 2200/4018; F02D 2200/70; F02B 29/02; F02B 29/04; F02B 29/0418; F02B 29/0426; F02M 35/10255
See application file for complete search history.

(56) References Cited

U.S. PATENT DOCUMENTS

| | | |
|---|---|---|
| 6,705,084 B2 | 3/2004 | Allen et al. |
| 6,735,945 B1 | 5/2004 | Hall et al. |
| 7,779,634 B2 | 8/2010 | Barthelet et al. |
| 8,371,121 B2 | 2/2013 | Gödeke et al. |
| 9,938,913 B2 | 4/2018 | Dudar |
| 10,337,460 B2 * | 7/2019 | Sixel ...................... F02M 23/06 |
| 2013/0205774 A1 | 8/2013 | Styles et al. |
| 2014/0047833 A1 | 2/2014 | Buckland et al. |
| 2014/0048049 A1 | 2/2014 | Glugla et al. |
| 2014/0075976 A1 | 3/2014 | Glugla et al. |
| 2018/0149121 A1 | 5/2018 | Owen et al. |
| 2019/0162109 A1 | 5/2019 | Romana et al. |

\* cited by examiner

PRESSURIZED AIR INDUCTION SYSTEM

CROSS REFERENCE TO RELATED APPLICATIONS

The present application is a continuation-in-part of U.S. Non-Provisional patent application Ser. No. 16/803,357, entitled "PRESSURIZED AIR INDUCTION SYSTEM", and filed on Feb. 27, 2020. U.S. Non-Provisional patent application Ser. No. 16/803,357 is a divisional of U.S. Non-Provisional patent application Ser. No. 15/826,401, entitled "PRESSURIZED AIR INDUCTION SYSTEM," and filed on Nov. 29, 2017. The entire contents of the above-listed application are hereby incorporated by reference for all purposes

FIELD

The present description relates generally to methods and systems for controlling a vehicle engine to provide a boosted air charge.

BACKGROUND/SUMMARY

By incorporating a turbocharger, comprising a compressor driven by a turbine, into an engine of a vehicle, the efficiency and power output of the engine may be improved. The forced induction of extra air into a combustion chamber of the engine proportionally induces the combustion of additional fuel, producing more power than obtained from air intake at ambient pressure. The pressurized, or boosted, air is typically heated during compression and if combusted directly, may increase the risk of engine knock. Thus, boosted air is typically cooled by flowing the air through a charge air cooler (CAC) before entering the engine intake manifold, a process that also increases the density of the air and improves intake throttle response.

The air compression provided by the compressor of the turbocharger is enabled by the rotation of the turbine. Typically, at least a portion of the exhaust gas is routed to the turbine and the expansion of the exhaust gas causes the turbine to spin. Since the turbine is mechanically coupled to the compressor, as the turbine spins up, so does the compressor. However, there may be a delay between the time when an increase in torque is demanded and when the corresponding boost pressure is provided by the compressor. The delay, also referred to as turbo lag, is due to the turbine's inertia and friction when operating at low engine loads, and corresponds to a duration required for the engine to generate sufficient exhaust gas (e.g., exhaust flow and temperature) to spool up the turbine to drive the compressor. During this turbo lag, boosted engine performance may be degraded.

Various approaches have been developed to address the issue of turbo lag, including providing a boost reservoir. In an example of a boost reservoir, a turbo boost system may supply cool compressed air to an engine at high engine loads. At low engine loads, the boosted air may be stored in a reservoir while ambient air is alternatively supplied to the engine. Upon a vehicle operator tip-in, the reservoir may provide boosted air to the engine until the turbine spools to drive the compressor.

However, the inventors herein have recognized potential issues with such systems. In general, there may be conditions where the density of the compressed air held in the boost reservoir may decrease, reducing the engine's throttle response when the reservoir air is supplied to the engine. In particular, there may be conditions where a boost reservoir is purged of warmed boosted air and subsequently refilled. During the purge of warmed boosted air, the density of the compressed air held in the reservoir may decrease. In the event a tip-in occurs interrupting the purge of warmed air from the boost reservoir, the low-density air supplied from the boost reservoir may reduce the engine's response and engine may be unable to meet to the torque request.

In one example, the issues described above may be addressed by a boosted engine method for reducing turbo lag comprising: storing compressed air in a reservoir for supply to the engine during increased engine load operating conditions and replenishing the air in response to pressure dropping below a nominal threshold; and increasing the pressure beyond the nominal threshold in response to increased temperature of the stored air in the reservoir even when operating conditions include decreased engine load, and purging the increased temperature stored air to bring pressure back down toward the nominal threshold. In this way, the density of compressed air held in a boost reservoir may be maintained so that boost is readily available during an increase in torque demand.

As one example, a PAI system may be configured to store in a boost reservoir air compressed by an engine turbocharger. An external source of compressed air may be adapted to the PAI system. The external source of compressed air may increase the pressure of the boost reservoir by supplying additional compressed air to the PAI system. In one example, the external source of compressed air may include an air suspension system. Alternatively, compressed air may be supplied via an air compressor separate from the engine turbocharger compressor. While compressed air is stored, e.g., at low engine load or torque request below a threshold, the external source of compressed air may replenish and maintain the pressure of the boost reservoir by supplying additional compressed air. Immediately before a purge of the boost reservoir, the external source of compressed air may supply additional compressed air to increase the air pressure of the reservoir above the nominal threshold. Spark timing may be retarded in response to boosted air supplied to the engine in excess of torque demand. In response to a vehicle operator tip-in during the increasing of the pressure beyond the nominal threshold, stored compressed air may be supplied to the engine while replenishing the air.

In this way, by adapting a pressurized air induction system with an external source of compressed air, the boost pressure in a boost reservoir may be maintained. As such, this may improve turbo lag. The technical effect of using an external compressed air source to increase the air pressure in a pressurized air induction system is that the boost performance of the engine can be remain elevated and responsive to operator demand. Specifically, air in the reservoir may be maintained at a pressure threshold capable of improving throttle response when discharged. By maintaining the pressure of the reservoir with compressed air from an external compressed air source, the reservoir may rapidly provide boost pressure to engine cylinders during a tip-in. In this way, boosted engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

DETAILED DESCRIPTION

Figure 1:
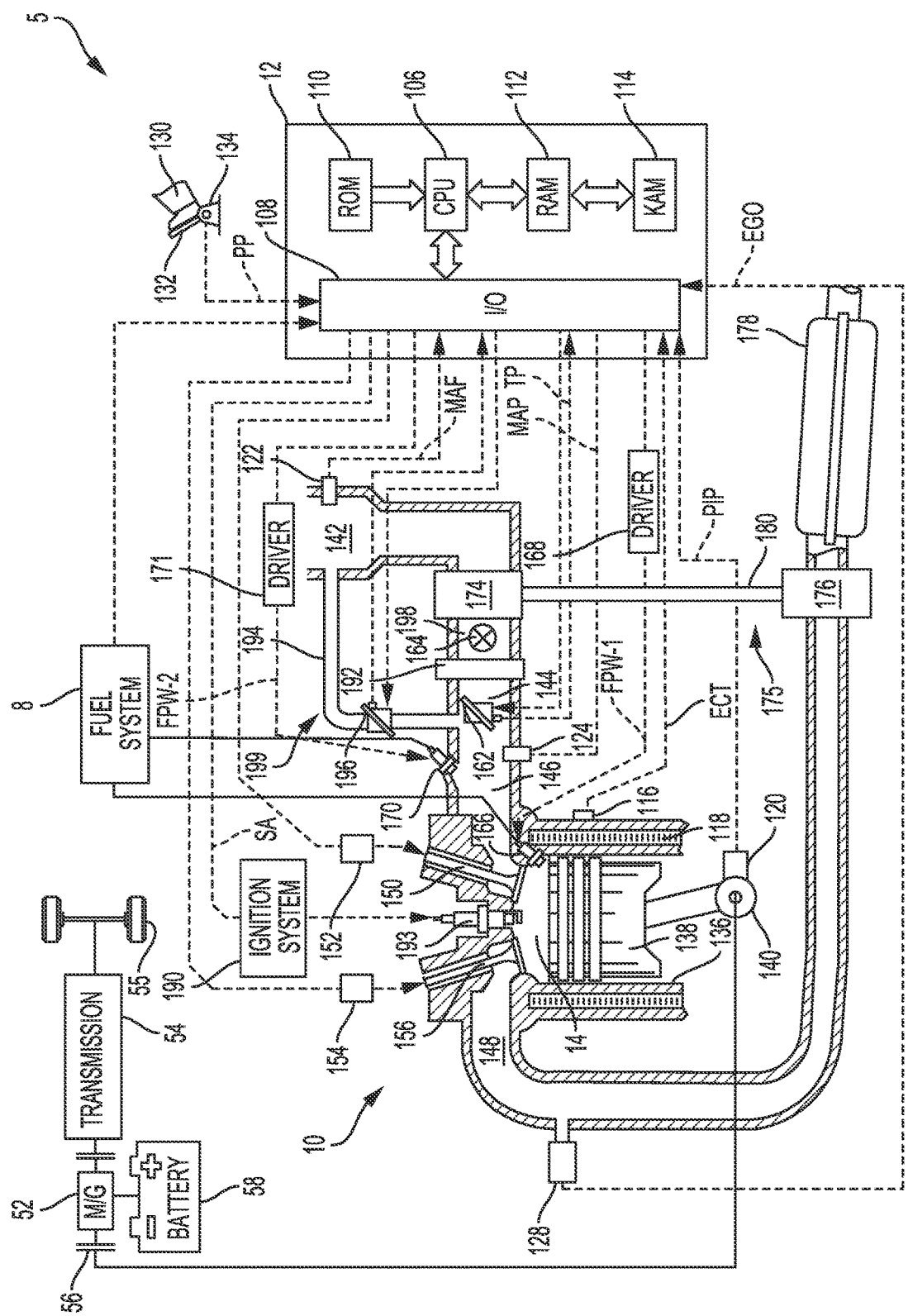
FIG. 1 shows an example engine system for a single turbo boosted hybrid vehicle.
Figure 2A:
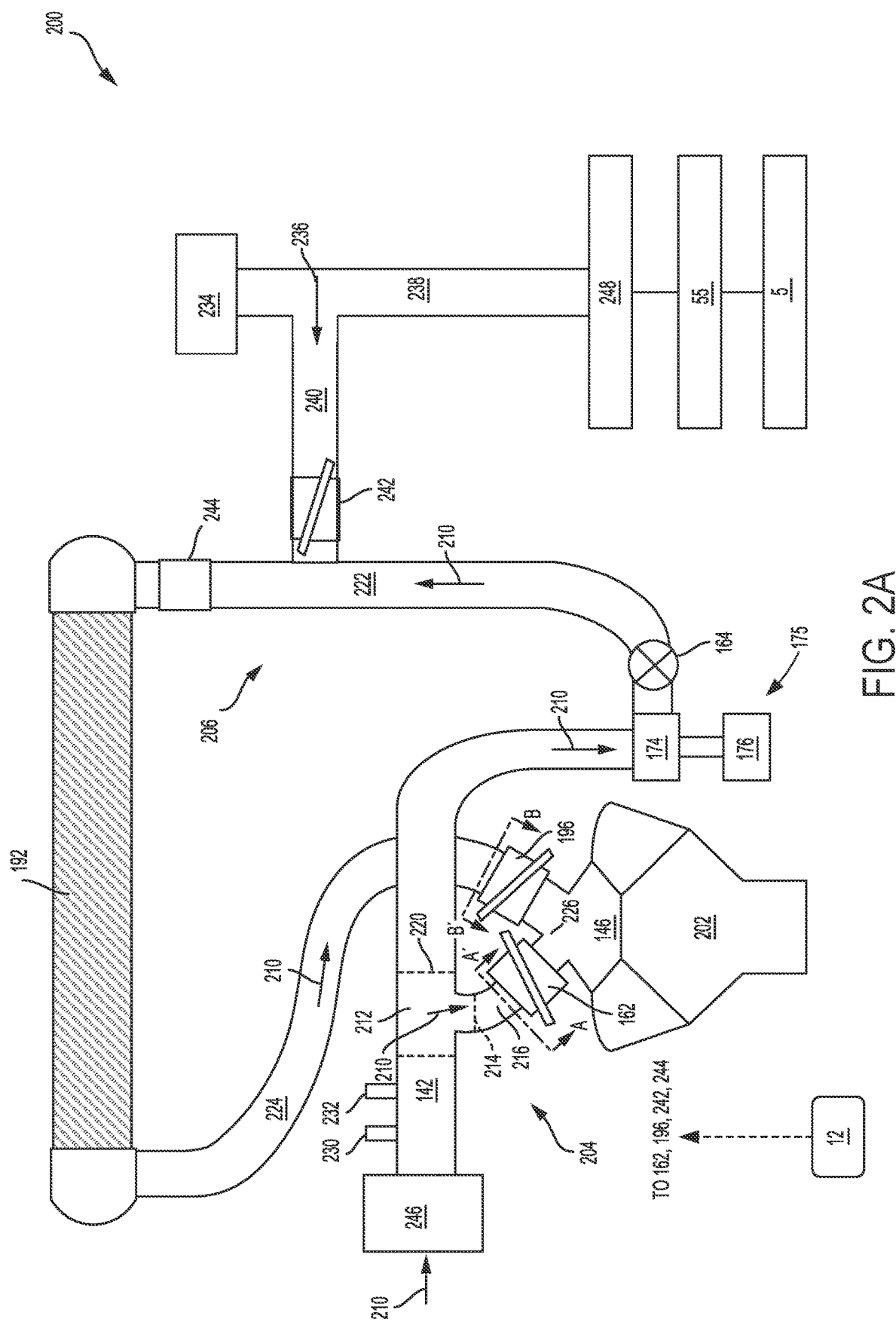
FIG. 2A shows a schematic illustration of a pressurized air induction system for an engine adapted with a first embodiment of an external compressed air source.
Figure 2B:
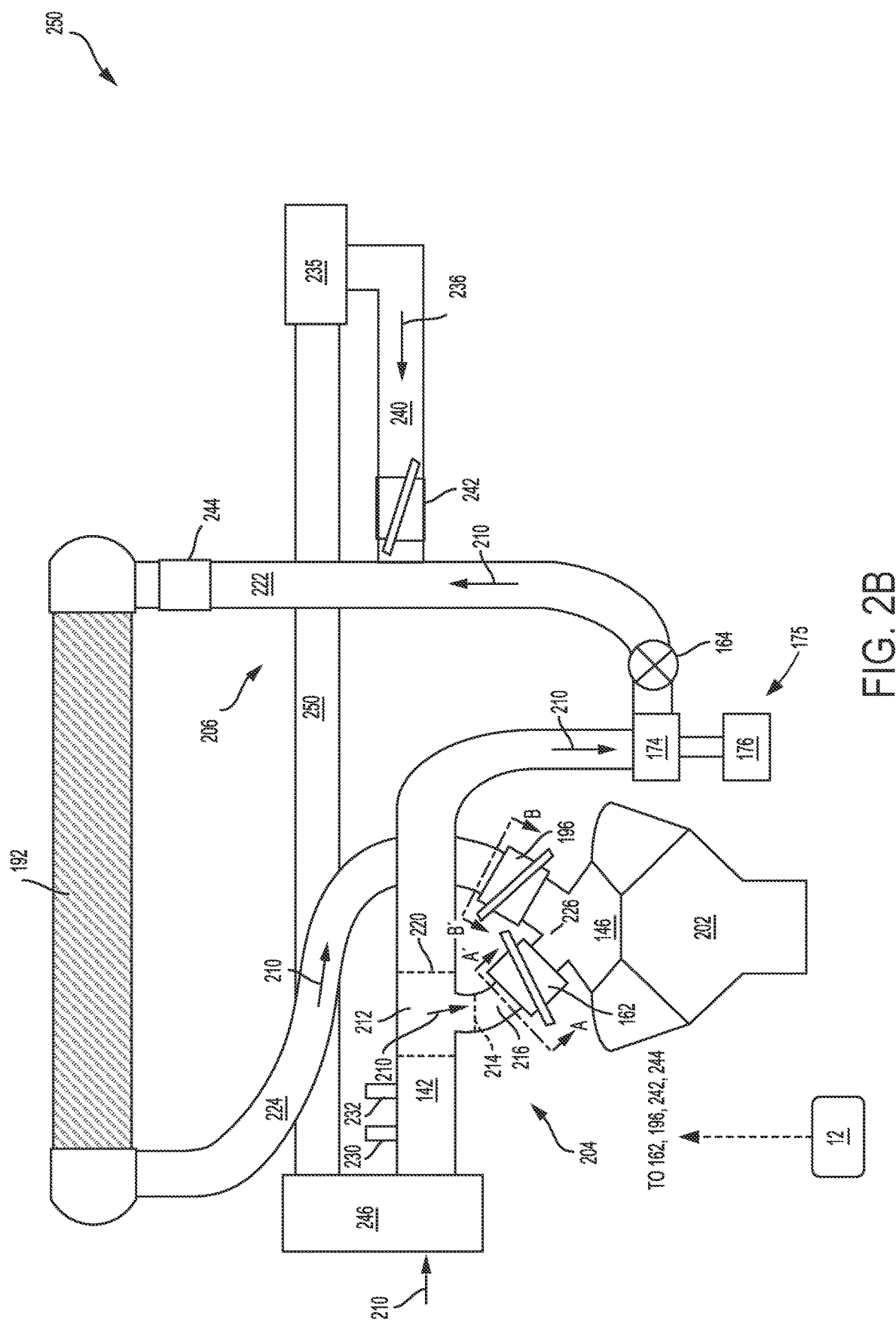
FIG. 2B shows a schematic illustration of a pressurized air induction system for an engine adapted with a second embodiment of an external compressed air source.
Figure 3A:
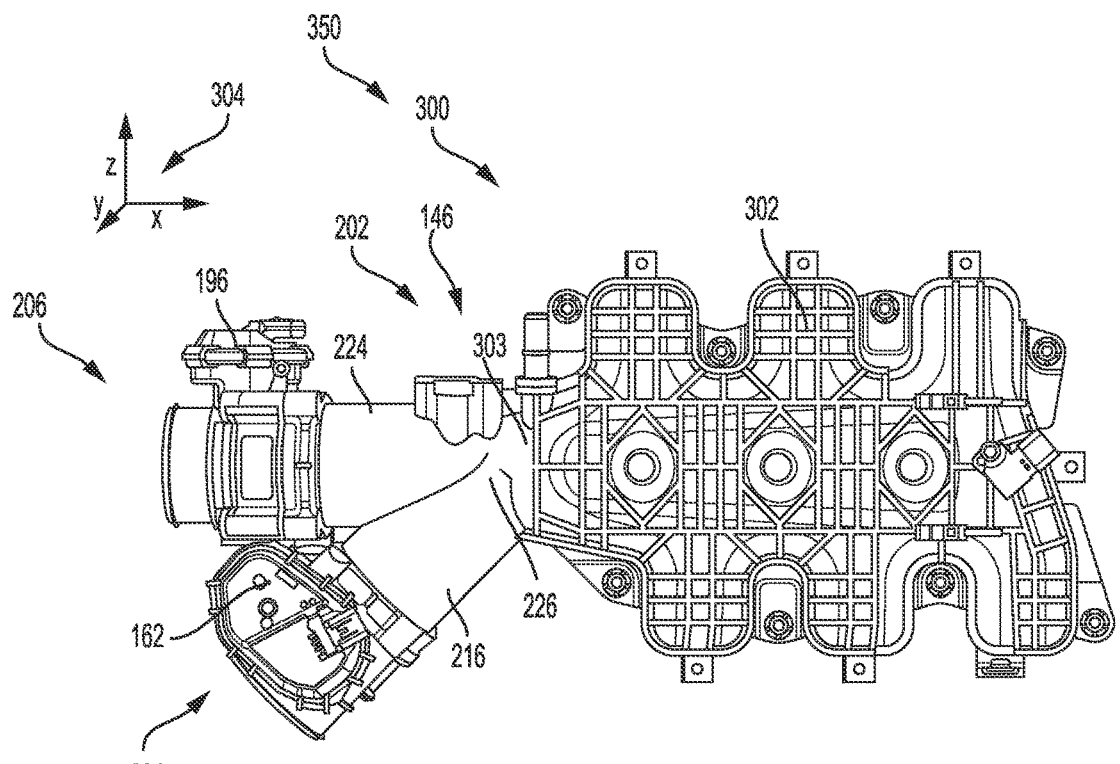
FIG. 3A shows a top view of a first embodiment of the pressurized air induction system.
Figure 3B:
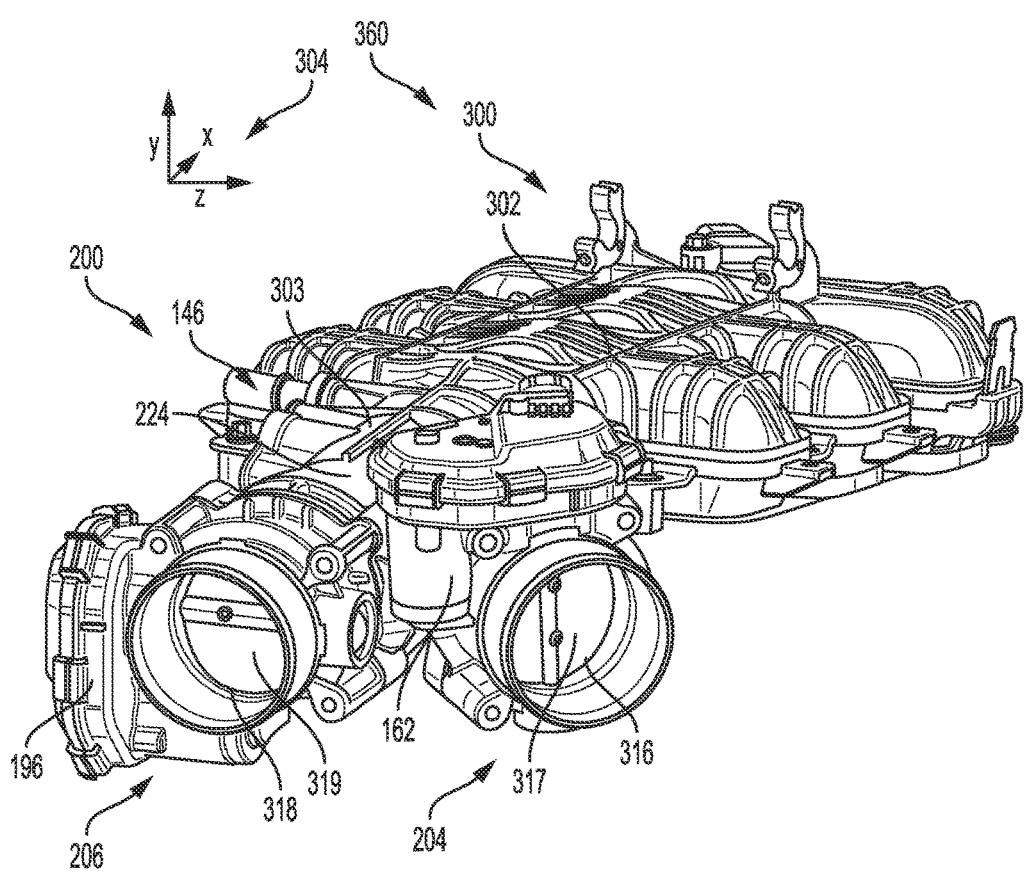
FIG. 3B shows an isometric perspective view of the first embodiment of the pressurized air induction system.
Figure 4B:
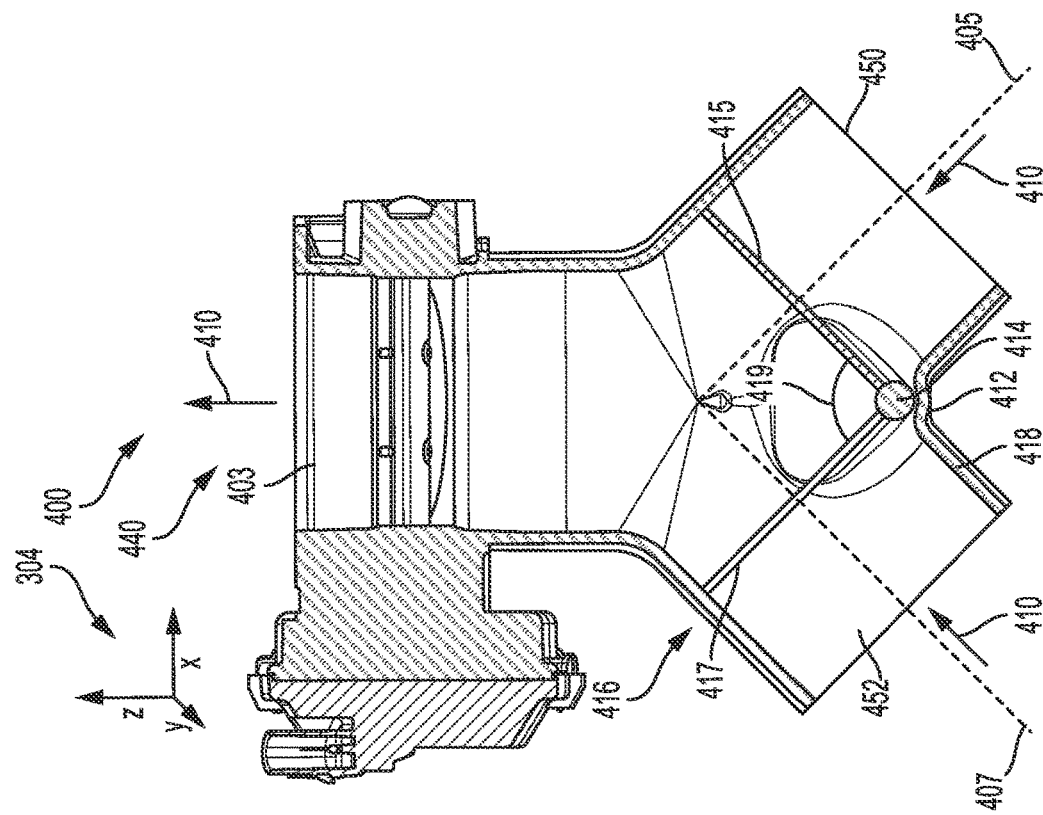
FIG. 4B shows a cross-sectional view of the second embodiment of the pressurized air induction system.
Figure 4A:
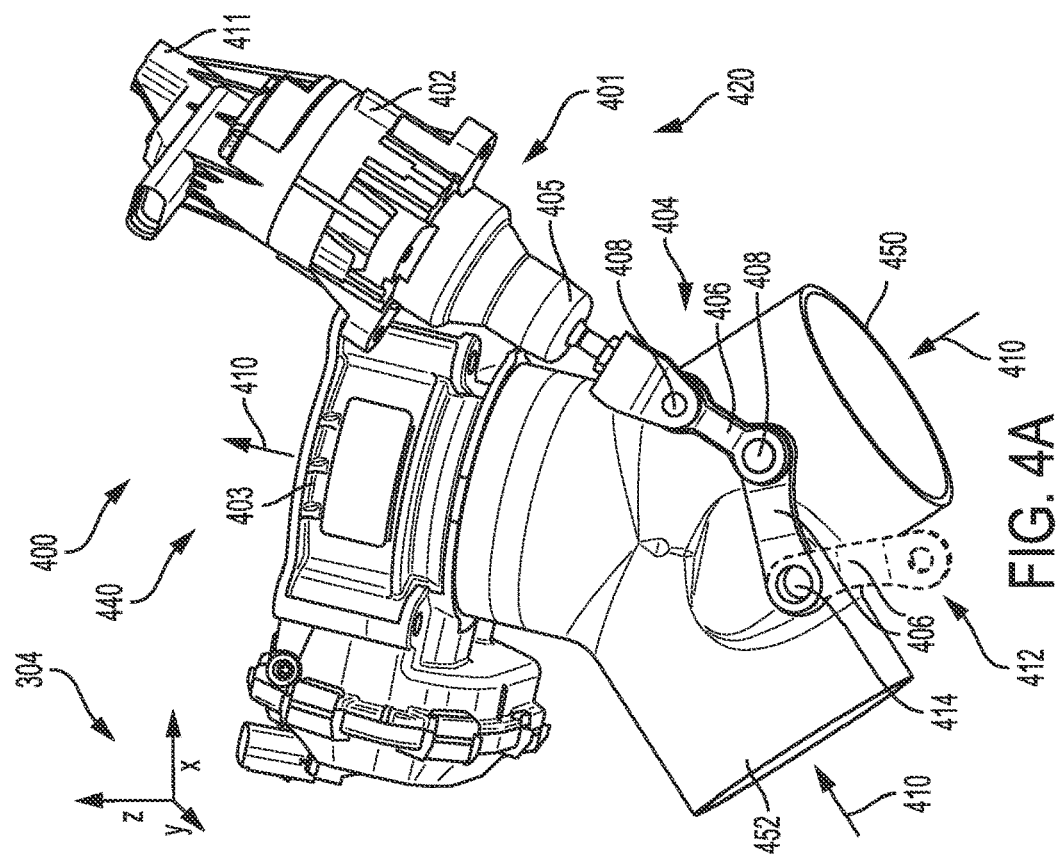
FIG. 4A shows a top view of a second embodiment of the pressurized air induction system.

The following description relates to systems and methods for providing cold, compressed air to a boosted engine system, such as the system of FIG. 1, via a pressurized air induction system, such as the system of FIGS. 2A and 2B. The pressurized air induction system may include a first and a second air passage for air flow, each passage coupled at a first end to a fresh air duct and coupled at a second end to an intake plenum upstream of an engine cylinder. As shown in FIGS. 2A and 2B, the first air passage may flow fresh ambient air to the engine while the second air passage may flow air via a compressor and a charge air cooler (CAC). Specifically, FIG. 2A depicts an embodiment of the system where a second source of compressed air may be supplied by an external system, e.g., an air suspension system. FIG. 2B depicts an alternative embodiment of the system where a second source of compressed air may be supplied by a second compressor. Flow through the first and second passages may be controlled via individual throttle valves, as shown in the embodiment of FIGS. 3A-3B. Alternatively, the relative flow between the passages may be controlled via a splitter valve, as shown in the embodiment of FIGS. 4A-4B. A controller may be configured to perform a control routine, such as the example routine of FIG. 5A, to adjust a position of the valve(s) based on engine speed-load conditions so that an amount of cool compressed air can be stored in the second passage acting as a reservoir, the compressed air released responsive to an increase in torque demand to reduce turbo lag. The controller may also adjust the valve(s) to discharge any trapped air based on an inferred amount of heat transferred into the air subsequent to pre-filling the reservoir based on a pressure measurement described in the subroutine of FIG. 5B. An example operation of the pressurized air induction system is illustrated herein with reference to FIG. 6. In this way, boosted engine performance is improved.

FIG. 1 depicts an example of a cylinder of internal combustion engine 10 of a vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Engine 10 is a boosted engine comprising a turbocharger 175 for providing a boosted intake air charge. Although engine 10 is shown coupled to one turbocharger, other embodiments of engine 10 may include more than one turbocharger to provide boost. Turbocharger 175 is configured with a first compressor 174 and an exhaust turbine 176. The first compressor 174 is an engine turbocharger compressor arranged in an air intake passage 142, which draws fresh ambient air into the engine 10. The first compressor 174 is driven by the exhaust turbine 176. Since the compression of air heats the air charge, the boosted air is flowed through a charge air cooler (CAC) 192 where it is cooled before being delivered to engine cylinders. CAC 192 may be a water-air or air-air based heat exchanger. The turbine 176 is positioned in an exhaust passage 148 downstream of the cylinder 14 and upstream of an emission control device 178. Turbine 176 is connected to first compressor 174 mechanically by a shaft 180. The rotation of turbine 176 is driven by hot expanding exhaust gas flowing from cylinder 14 through exhaust passage 148 towards emission control device 178, the spinning of turbine 176 at least partially powering the rotation of the compressor via the shaft 180. Engine 10 further includes a pressurized air induction (PAI) system 199 configured to deliver air to cylinder 14. The PAI system 199 includes a bypass duct 194 coupled at a first end to air intake passage 142 at a location upstream of first compressor 174 and at a second end to an intake plenum 146. In this way, bypass duct 194 may constitute a first air passage of the PAI system 199 while air intake passage 142 leading into air intake passage 198 including first compressor 174 and CAC 192 constitutes a second air passage of the PAI system 199. The configuration of the PAI system 199 is elaborated in detail at FIGS. 2A and 2B. Example embodiments of the PAI system 199 are detailed at FIGS. 3A-3B and FIGS. 4A-4B.

Cylinder 14 can receive intake air via air intake passages 142, 198, 144, and bypass duct 194 and the intake plenum 146, of which a general representation is shown in FIG. 1. Intake plenum 146 can communicate with other cylinders of engine 10 in addition to cylinder 14. FIG. 1 shows engine 10 configured with the turbocharger 175 including first compressor 174 arranged between intake passages 142 and 198 and turbine 176 arranged along exhaust passage 148. Air intake passage 142 and bypass duct 194 flow air at ambient conditions while air intake passages 198 and 144 contain air that is boosted briefly by first compressor 174. The CAC 192 may be disposed downstream of first compressor 174 and upstream of a first throttle 162 in air intake passage 198 with a pressure relief valve (PRV) 164 positioned in between first compressor 174 and CAC 192. The first throttle 162, which is also an air throttle, and a second throttle 196, which is also a boost throttle, may be provided along bypass duct 194 and intake passages 144, respectively, of the engine for varying the flow rate and/or pressure of intake air provided to the engine cylinders. For example, first throttle 162 may be positioned downstream of a CAC 192 as shown in FIG. 1, or alternatively may be provided upstream of CAC 192.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake poppet valve 150 may be controlled by controller 12 via actuator 152. Similarly, exhaust poppet valve 156 may be controlled by controller 12 via actuator 154. During some conditions, controller 12 may vary the signals provided to actuators 152 and 154 to control the opening and closing of the respective intake and exhaust valves. The position of intake poppet valve 150 and exhaust poppet valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 193 for initiating combustion. Ignition system 190 can provide an ignition spark to cylinder 14 via spark plug 193 in response to spark advance signal SA from controller 12, under select operating modes. However, in some embodiments, spark plug 193 may be omitted, such as where engine 10 may initiate combustion by auto-ignition or by injection of fuel, as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 193. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake plenum 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single electronic driver 168 or 171 may be used for both fuel injection systems, or multiple drivers, for example electronic driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

As described above, a vehicle may be adapted with a pressurized air induction (PAI) system coupled to an engine to improve performance during operations demanding increased torque. In some embodiments, the pressurized air induction (PAI) system may include an external compressed air source. A pressurized air induction (PAI) system 200 and a first embodiment of the external compressed air source is described in FIG. 2A. A PAI system 250 and a second embodiment of the external compressed air source is described in FIG. 2B. In the PAI system 200 shown in FIG. 2A, an external compressed air source may be supplied from an external system of the vehicle, e.g., a system distinct from the turbo system, such as, an air suspension system. In an alternative embodiment, compressed air may be supplied by a unique compressor of the vehicle, as shown in the PAI 250 of FIG. 2B. Elements that are common elements to FIG. 1, FIGS. 2A and 2B are similarly numbered and described in general with respect to FIG. 2A. Alternative embodiments with respect to FIG. 2B are described following.

The pressurized air induction (PAI) system 200 shown in FIG. 2A may be coupled to an engine intake manifold 202. The engine intake manifold 202 may direct air flow to a plurality of cylinders, such as cylinder 14 of FIG. 1, in which air may be mixed with fuel for combustion. The PAI system includes a first air intake passage, hereafter referred to as first passage 204, for delivering ambient air and a second air intake passage, hereafter referred to as second passage 206, for delivering compressed and cooled air to intake manifold 202. A direction of air flow through both the first passage 204 and second passage 206 of the PAI system is indicated by arrows 210. Air may be received in the PAI system 200 via an air filter 246 leading to an intake passage 142, which may, in one example, be the air intake passage 142 of FIG. 1. Air may then flow into the first passage 204 and/or continue along intake passage 142 into the second passage 206.

The first passage 204 of PAI system 200 is coupled to the intake passage 142 via a coupling, shown in this example as a T-body 212. Other couplings, however, may be similarly used. The T-body 212 has a first junction 214 from which a bypass duct 216 of the first passage 204 extends. In one example, bypass duct 216 may be the bypass duct 194 of FIG. 1. The bypass duct 216 diverts air drawn from intake passage 142 to intake plenum 146 while bypassing a compressor. As a result of the bypass duct, the first passage 204 has a shorter length relative to the second passage 206, enabling air at ambient pressure to be rapidly delivered to the engine intake manifold 202 when required by increasing an opening of the first passage 204. Thus first passage 204 acts as a shortcut for supplying ambient air to the engine intake manifold 202 during low engine loads and speeds where little or no boost is desired, e.g., following a tip-out. By supplying ambient air to the engine intake manifold 202 that is not cooled prior to delivery, condensation within the first passage 204 may be avoided.

The first passage 204 may also include the first throttle 162 positioned at a downstream end of the bypass duct 216 that is distal relative to the T-body 212 and proximal to the intake plenum 146 of the engine intake manifold 202. In one example, the first throttle 162 may control flow through the first passage 204 to the engine intake manifold 202 based on signals received from controller 12. Controller 12 may command a degree of opening to first throttle 162 based on input indicative of torque demand, such as based on input from an accelerator pedal. Based on the degree of opening of first throttle 162, an amount of air flowing through intake passage 142 may be drawn through the first junction 214 of the T-body into bypass duct 216, and then delivered to engine intake manifold 202 upon passage through first throttle 162. As such, the air diverted into the first passage 204 bypasses components included in the second passage 206 that boost and cool the air contained therein.

The second passage 206 is coupled to air intake passage 142 downstream of T-body 212 via second junction 220. The second junction 220 may be arranged perpendicular to the first junction 214. In one example, the coupling of the second passage 206 to the first passage 204 via the T-body may give PAI system 200 a Y-shaped structure. Specifically, by incorporating a T-body into intake passage 142 to couple the bypass duct 216 to the intake passage, the PAI system 200 may have a Y-shape in the region comprising intake passage 142, T-body 212, and bypass duct 216.

Air flowing into the PAI system 200 may flow through second junction 220 of the T-body 212 before entering second passage 206. Second passage 206 is a boosted air passage including first compressor 174 and CAC 192. In one example, first compressor 174 is coupled in the turbocharger 175 and is driven via exhaust turbine 176.

Intake passage 142 extends into second passage 206 downstream of the second junction 220 of the T-body 212 and is coupled to intake plenum 146 downstream of first compressor 174 and CAC 192. Second passage 206 also includes the second throttle 196 positioned at a downstream end of second passage 206 that is proximal to the intake plenum 146. The second throttle 196 may be actuated in a similar manner to the first throttle 162 via instructions from the controller 12 in response to an input device, such as the accelerator pedal. Delivery of air from the second passage 206 to the engine intake manifold 202 may be controlled by actuation of the second throttle 196 between a fully open and a fully closed position (to any position there-between). For example, when there is an increase in torque demand and the engine is operated at a mid-high speed-load region, the first compressor 174 may be operated and the second throttle 196 may be opened to deliver the boosted air.

Second passage 206 includes a first branch 222 defining a region of second passage 206 from downstream of junction 220 to an inlet of CAC 192, and a second branch 224 defining a region of second passage 206 from an outlet of CAC 192 to a location where the second passage is coupled to intake plenum 146. Air flows through the second passage 206 in a downstream direction from second junction 220 of T-body 212 to first compressor 174, then through the PRV 164 before flowing into CAC 192. Air compressed via the first compressor 174 is then cooled upon passage through CAC 192. Cooled compressed air then flows from CAC 192 into intake plenum 146 via second throttle 196.

Air flowing through intake passage 142 may first undergo compression by first compressor 174, hereafter referred to as boosted air, and subsequently pass through PRV 164. PRV 164 may be a one-way valve that ensures that the boost pressure is contained on a downstream side of PRV 164, so that reverse flow of boosted air through the second passage 206 does not occur. PRV 164 remains closed until a pressure threshold is exceeded. For example, the pressure threshold may be a non-zero pre-set value based on a safety rating of pressure allowance of the walls of the first branch 222 and second branch 224 or of fittings connecting the first branch 222 and second branch 224 to the CAC 192. In one example, the pressure threshold may be 14 Psi. When the boost pressure downstream of PRV 164 exceeds a threshold, PRV 164 may open to release the pressure.

Continuing along the path of air flow in second passage 206, air may flow through PRV 164 into first branch 222 and then flow through CAC 192. In one example, CAC 192 may be coupled to an engine cooling circuit that enables heat transfer from air, heated during compression, through surfaces of CAC 192 to a coolant. The heat exchange occurring at the CAC 192 both cools the air and increases the density of the air flowing through CAC 192 that is eventually delivered to the engine intake manifold 202, thereby improving the intake throttle response of the boosted engine. The flow of coolant through the CAC 192 may be varied based on boosted engine operating conditions. For example, flow of coolant through CAC 192 may be enabled when the engine is operating boosted, such as when first compressor 174 is operated and second throttle 196 is at least partially open. As another example, flow of coolant through CAC 192 is disabled when the engine is operating without boost, such as when first compressor 174 is not operated and second throttle 196 is held closed. By limiting operation of the CAC 192 to conditions when the engine is operating boosted, the engine's fuel economy may be improved by minimizing wasteful operation of the CAC 192. In addition, component life of the CAC 192 is increased.

Upon exiting CAC 192, the cooled, boosted air enters the second branch 224 of second passage 206, and flows through second throttle 196. The second throttle 196 controls the delivery of cooled, boosted air from the second passage 206 into the intake plenum 146. The intake plenum 146 then directs cooled, boosted air to the engine intake manifold 202 and thereon to the engine cylinders.

In addition to providing a passage for boosted air when the second throttle is opened, the second passage 206 may also function as a reservoir of boosted air when the second throttle 196 is closed. For example, responsive to a tip-out following boosted engine operation, the second throttle 196 may be closed to retain compressed air within second passage 206 such as within at least the second branch 224 of the second passage 206. In this way, when the second throttle 196 is closed, the second passage 206 may act as an air induction reservoir. During light engine loads when boosted air is not required, the first throttle 162 is opened and the second throttle 196 is closed, enabling boosted air to be stored within PAI system 200. During a subsequent vehicle operator tip-in, the stored boosted air may be quickly delivered to the intake plenum 146 and then to the engine intake manifold 202 via the opening of second throttle 196, while the first compressor 174 is spooled up. In this way, the release of the stored air from the second passage 206 reduces turbo lag.

As such, the boost supporting potential of the stored boosted air may be affected by its temperature. Specifically, the release of cool compressed air, stored in the second passage 206 during a tip-out, and released from the second passage 206 during a subsequent tip-in, may reduce turbo lag as long as the compressed air is sufficiently cool. However, when the second passage 206 is in a passive state while holding a reservoir of boosted air and with cooling operation of the CAC 192 disabled, heat may be transferred to the stored air. The amount of heat transferred may be determined as a function of ambient conditions. For example, as the ambient temperature rises, and/or the ambient humidity rises, the amount of heat transferred from the ambient air surrounding the PAI system 200 to the cool compressed air retained in the second passage 206 may increase. Warming of the boosted air may reduce the density of the air, reducing the throttle response of the boosted air when it is released, and thereby lowering the amount of boost that it can provide. Accordingly, the PAI system 200 may be adapted to release the stored boosted air from the second passage 206 when a temperature or time threshold is exceeded, independent of the torque demand.

The engine boosting ability of air for a torque request may be affected by the duration of storage and the replenishing of the reservoir with turbocharger compressed air. As such, compressed air from an external compressed air source may maintain the reservoir air pressure between uses. Lag time in the availability of boosted air for a torque may be further minimized by increasing the air pressure in the reservoir prior to the reservoir discharge, e.g., by pre-filling above a threshold pressure. In one example, an existing vehicle system may supply a second compressed air source to the second passage 206 via a supply line 240 coupled to the second passage. In one example, the second compressed air source may come from another system in the vehicle that requires compressed air, such as an air ride suspension system 248. In one example, the air ride system 248 may be coupled to the wheels 55 of the vehicle 5. In one example, the air ride suspension system 248 may be coupled to a second compressor 234 via one or more intervening lines, e.g., line 238. In one example, the second compressor 234 may compress ambient air and supply it to the air ride suspension system 248 via the line 238. Air pressure within the second passage 206 may be measured by a pressure sensor 244 coupled to the first branch 222. A controller, e.g., controller 12 of FIG. 1, may operate a second air source valve 242 based on signals received from the pressure sensor 244 to provide additional compressed air to the second passage 206. In one example, operation of the second air source valve 242 may direct a flow of compressed air, shown as arrow 236, from the air ride suspension system 248 via the line 238 coupled to a supply line 240 that intersects with the first branch 222 of the second passage 206. In an example, if the pressure sensor 244 detects reservoir pressure below a threshold, the second air source valve 242 may be adjusted to direct a flow of compressed air into the reservoir to bring up the air pressure to the threshold. In another example, the air pressure in the reservoir may be increased above a threshold prior to discharging the boost reservoir. By supplementing air pressure in the second passage 206, substantial pressure loss in the boost reservoir may be minimized and boosted air made available for a torque request.

In an example, while the second throttle 196 is closed, the controller may estimate or infer the amount of heat being transferred to the stored air. In one example, the output of an ambient humidity sensor 230 and an ambient temperature sensor 232 arranged along intake passage 142, upstream of the T-body 212 may be used to estimate ambient humidity and ambient temperature, respectively, when the second throttle 196 is closed. Based on the measured ambient conditions, the controller may calculate an amount of heat transferred to the stored boosted air, a rate of rise in temperature, and an inferred boosted air temperature. The inferred boosted air temperature may be additionally or optionally determined as a function of the boosted air temperature at the time the second throttle 196 was closed, as well as a duration elapsed since the second throttle 196 was closed. In one example, the controller may use a model or algorithm to infer the temperature of the boosted air retained in the second passage 206, in real-time. If the inferred temperature of the stored air exceeds a threshold before a subsequent tip-in event is confirmed, the controller may request to release the stored air from the second passage 206. Following the release request, the controller may measure the pressure in the second passage 206. Responsive to the pressure in the second passage measuring less than a threshold pressure, an opening of the second source valve 242 may be adjusted to allow a flow of compressed air from the air suspension system 248. Thereafter, the controller may actuate the second throttle 196 to at least a partially open position to discharge the stored air to the engine while still at low engine speeds or loads. In one example, the second throttle 196 may be transiently shifted to a fully open position to release the stored air, and then returned to the closed position. An opening of the first throttle 162 may be adjusted based on the transient opening of the second throttle 196, as elaborated at the methods of FIG. 5A and 5B. In addition, one or more engine operating parameters, such as spark timing, may be adjusted to reduce torque transients associated with the release of the warm compressed air into the engine intake manifold 202.

An alternative embodiment of an external compressed air source for a PAI system 250 is depicted in FIG. 2B. As above with respect to the PAI system 200, a second source of compressed air may be used to increase the air pressure in the second passage 206 prior to the purge of the reservoir. In one example, a second source of compressed air may include a second compressor 235 that is separate and independent from the PAI system. In one example, the second compressor 235 may compress fresh air supplied from the air filter 246 via filter path 250. The second compressor 234 may supply compressed air to the second passage 206 via a supply line 240 directly coupled to the second passage at first branch 222. Similar to the embodiment described in FIG. 2 A, pressure within the second passage 206 may be measured by a pressure sensor 244 coupled to the first branch 222. A controller, e.g., controller 12 of FIG. 1, may operate a second air source valve 242 based on signals received from the pressure signal 244 to provide additional compressed air to the second passage 206. In one example, the air flow of the second compressed air source, indicated by an arrow 236, to the second passage 206 may mediated by the operation of a second air source valve 242 via supply line 240.

In the depicted example, each of first throttle 162 and second throttle 196 may be equipped with an actuating mechanism that receives separate signals from the controller 12. This allows the two throttles to be operated independently. A detailed embodiment of a PAI system 200 with distinct throttles is shown with reference to FIGS. 3A-3B. Alternatively, a single actuating mechanism may control the opening and closing of both the first throttle 162 and second throttle 196, in concert. In yet another embodiment, as detailed with reference to FIGS. 4A-4B, air flow to the engine from the first passage 204 and second passage 206 may be controlled by a single splitter valve arranged in the intake plenum 146 in a merging region 226 of the bypass duct 216 and second branch 224 of the second passage 206. In this arrangement, air delivered via the first passage and/or the second passage is simultaneously controlled by a single valve with dimensions optimized for the geometry at the merging region 226 of the intake plenum 146. Embodiments illustrating the use of the throttles (FIGS. 3A-3B) and the splitter valve (FIGS. 4A-4B) for directing airflow to the engine are further described in detail below.

A first embodiment 300 of a PAI system, such as of PAI system 200 of FIG. 2, is illustrated at FIGS. 3A-3B. A set of reference axes 304 is provided for comparison between views, indicating a "z" lateral direction, "x" horizontal direction, and "y" vertical direction. FIG. 3A depicts a top view 350 of the first embodiment 300 of PAI system 200. The first and second passages, with reference to the first and second passages 204 and 206 of FIG. 2, are cut-off upstream of the first throttle 162 along line A-A' and upstream of the second throttle 196 along line B-B' to provide the view shown in FIG. 3A. The first throttle 162 couples to a downstream end of the bypass duct 216 of the first passage 204 and the second throttle 196 couples a downstream end of the second branch 224 of the second passage 206, with reference to FIG. 2. The bypass duct 216 and second branch 224 merge in the intake plenum 146 at the merging region 226. The intake plenum 146 is connected to an intake manifold 302 of a vehicle, such as vehicle 5 of FIG. 1.

The bypass duct 216 and second branch 224 merge so that the merging region 226 is Y-shaped. Air flowing into the intake manifold 302 from either the first bypass duct 216 or second branch 224, or simultaneously from both, is directed into a merged channel 303, e.g. the stem of the Y-shape, of the intake plenum 146 before entering the engine intake manifold 302. When ambient air enters the intake plenum 146 from bypass duct 216 and boosted air enters via the second branch 224, the two types of air are mixed within the merged channel 303 of the intake plenum 146 before flowing to the engine intake manifold 302. In this way, the air entering the engine intake manifold 302 may have a temperature and pressure determined by the proportional mixing of the warmer, ambient air and the cooler, boosted air.

A view 360, taken from a direction along the second branch 224 of the second passage 206, of the first and second throttles 162 and 196 depicted in FIG. 3B shows that the first throttle 162 and second throttle 196 may block the flow of air by extending a first sealing wall 317 entirely across a first opening 316 in the first throttle 162. Similarly, flow through the second throttle 196 may be blocked by extending a second sealing wall 319 entirely across a second opening 318. The first sealing wall 317 and second sealing wall 319 may be adjustable so that the first opening 316 and second opening 318, respectively, may be partially open. For example, the first sealing wall 317 may extend a portion across the first opening 316 in the first throttle 162, and similarly the second sealing wall 319 may extend a portion across the second opening 318 of the second throttle 196 where the portion may include 1-99% of the area of the first and second openings 316, 318. In other words, the first opening 316 of first throttle 162 and the second opening 318 of second throttle 196 may be reduced from fully open positions so that the first sealing wall 317 does not extend entirely across the first opening 316, and the second sealing wall 319 does not extend entirely across the second opening 318.

Based on engine speed and operation, a signal may be sent to each of first throttle 162 and second throttle 196 from a controller to adjust the first opening 316 and second opening 318, respectively. During low engine speeds and operating loads, the first throttle 162 is actuated to an open position, e.g., fully open, while the second throttle 196 is concurrently actuated to a closed position, e.g., fully closed, so that fresh air may be delivered via the first passage 204. Conversely, during high engine speeds and heavy operating loads, the first throttle 162 may be fully closed and the second throttle 196 fully opened so that cooled, boosted air may be delivered exclusively via the second passage 206. Furthermore, detection of a tip-out may result in either a fully open or partially open position of the first throttle 162 while the second throttle is fully closed. Subsequent to the tip-out and independent of torque demand, if a time or temperature threshold calculated for the stored boosted air is surpassed, the reservoir of boosted air is discharged. Therein, the first throttle 162 may receive a signal to fully close or reduce the first opening 316 as the second throttle 196 is simultaneously actuated to at least a partially open position. Air from both the first passage 204 and second passage 206 are thus delivered to the merged channel 303 of the intake plenum 146 and mixed therein before flowing to the engine intake manifold 302.

As discussed above, the air flow in the PAI system may be controlled by either a pair of throttles, one disposed in each of the first and second passages, or by a splitter valve. A second embodiment of a PAI system 400 is illustrated at FIGS. 4A-4B. Only an intake plenum 440 is depicted, which may be an embodiment of intake plenum 146 of FIG. 1, showing the coupling of a splitter valve 401 to the intake plenum 440. The intake plenum 440 has a first duct 450 that may couple to a first passage of the PAI system 400 that flows ambient air and a second duct 452 that may couple to a second passage that delivers cooled, boosted air. Air may enter each the of the first duct 450 and the second duct 452 in the directions indicated by arrows 410 and exit from the intake plenum 440 through a single channel 403 into which the first duct 450 and second duct 452 merge. The single channel 403 may direct air flow into an engine intake manifold, such as engine intake manifold 202 of FIG. 2.

The intake plenum 440 is viewed from above in FIG. 4A while a cross-section of the intake plenum 440, taken along the plane formed by the "z" lateral direction and "x" horizontal direction, is shown in FIG. 4B. In the embodiment of FIGS. 4A-4B, the first throttle 162 and second throttle 196 of FIGS. 3A-3B are replaced by a single splitter valve 401. The splitter valve 401 may provide a single mechanism for adjusting the flow through each of the first and second passage of the PAI system 400, in contrast to the separate mechanisms and control of the example PAI system 200 shown in FIGS. 3A-3B.

The splitter valve 401 splits flow between the first ducts 450 and second duct 452 of the intake plenum 440, thus acting as a single proportioning valve instead of two separate adjustable bodies, e.g. the first and second throttles 162 and 196 of FIGS. 3A-3B. Based on a position of the valve, the splitter valve 401 may enable flow through the first duct 450 exclusively, the second duct 452 exclusively, or from a combination of both the first and second duct 450 and 452. The amount of flow from each of the first and second ducts 450 and 452 relative to one another may be controlled by an actuator 402 of the splitter valve 401 based on a command signal received from an engine controller.

An outer portion 420 of the splitter valve 401 (e.g., the portion that is positioned outside of the intake plenum 440), may include an actuator 402 that is in electronic communication with the controller, such as controller 12 of FIG. 1, and an arm 404. The actuator 402 may be arranged adjacent to a single channel 403 into which the first duct 450 and second duct 452 merge. At a first end 409 of the actuator 402 that is upstream of a second end 411, the actuator 402 is connected to the arm 404. The actuator 402 receives signals that may be translated into movement of the arm 404.

The arm 404 extends across the second duct 452, in a direction perpendicular to air flow, as indicated by arrows 410, and may be fixed to a wall of the intake plenum 440 in a saddle 412, where the first duct 450 and second duct 452 meet, via a pin 414. The pin 414 extends through a wall 418 of the intake plenum 440. The arm 404 comprises a plurality of sections 406 connected by hinges 408 around which the plurality of sections 406 may be pivoted. The pivoting of the plurality of sections 406 of the arm 404 may rotate a V-shaped splitter 416 arranged inside the intake plenum 440, as shown in FIG. 4B.

The V-shaped splitter 416 has a first flap 415 positioned inside the first duct 450 which has a first central axis 405 and a second flap 417 positioned inside the second duct 452 which has a second central axis 407. The first central axis 405 is arranged perpendicular to the second central axis 407. The first flap 415 and second flap 417 may be connected to one another at a fulcrum defined by the position of the pin 414. The pin 414, extending through the wall 418, may connect to the V-shaped splitter 416 at the fulcrum inside the intake plenum 146, securing V-shaped splitter valve 416 to the saddle 412 at the fulcrum of the V-shape. Rotation of the pin 414 by the arm 404 may also rotate the V-shaped splitter 416.

The first flap 415 and second flap 417 may be at a fixed angle 419 relative to one another. The fixed angle 419 may be greater than 90 degrees or less than 90 degrees, but not 90 degrees in order to allow greater flow through of the first duct 450 than the second duct 452 or greater flow through the second duct 452 than the first duct 450 to the engine intake manifold by pivoting the V-shaped splitter 416 via the pin 414. When either the first flap 415 or the second flap 417 is arranged 90 degrees within the first duct 450 and second duct 452, respectively, the duct is sealed.

As an example, during conditions when more flow through the first duct 450 than the second duct 452 is desired, such as at low loads, the V-shaped splitter 416 may pivot so that the second flap 417 is slightly more or less than perpendicular to the second central axis 407. A smaller opening in the second duct 452 due to the near perpendicular positioning of the second flap 417 (in comparison to the first flap 415 which deviates further from perpendicular), allows more air flow through the first duct 450 than the second duct 452. In another example, if only flow through the first duct 450 is desired, adjusting the V-shaped splitter 416 so that the second flap 417 is perpendicular to the second central axis 407 may entirely close the second duct 452 while allowing the first flap 415 to remain open, thereby enabling exclusive flow through the first duct 450. To enable more flow through the second duct 452 than the first duct 450 during higher engine loads and speeds, the V-shaped splitter 416 may pivot so that the first flap is slightly more or less than perpendicular to the first central axis 405. This results in a larger opening in the second duct 452 than the first duct 450. For exclusive flow from the second duct 452, the V-shaped splitter 416 may be adjusted so that the first flap 415 is perpendicular to the first central axis 405. The first duct 450 is thus closed and air is delivered to the intake plenum 440 through the second duct 452.

Figure 5A:
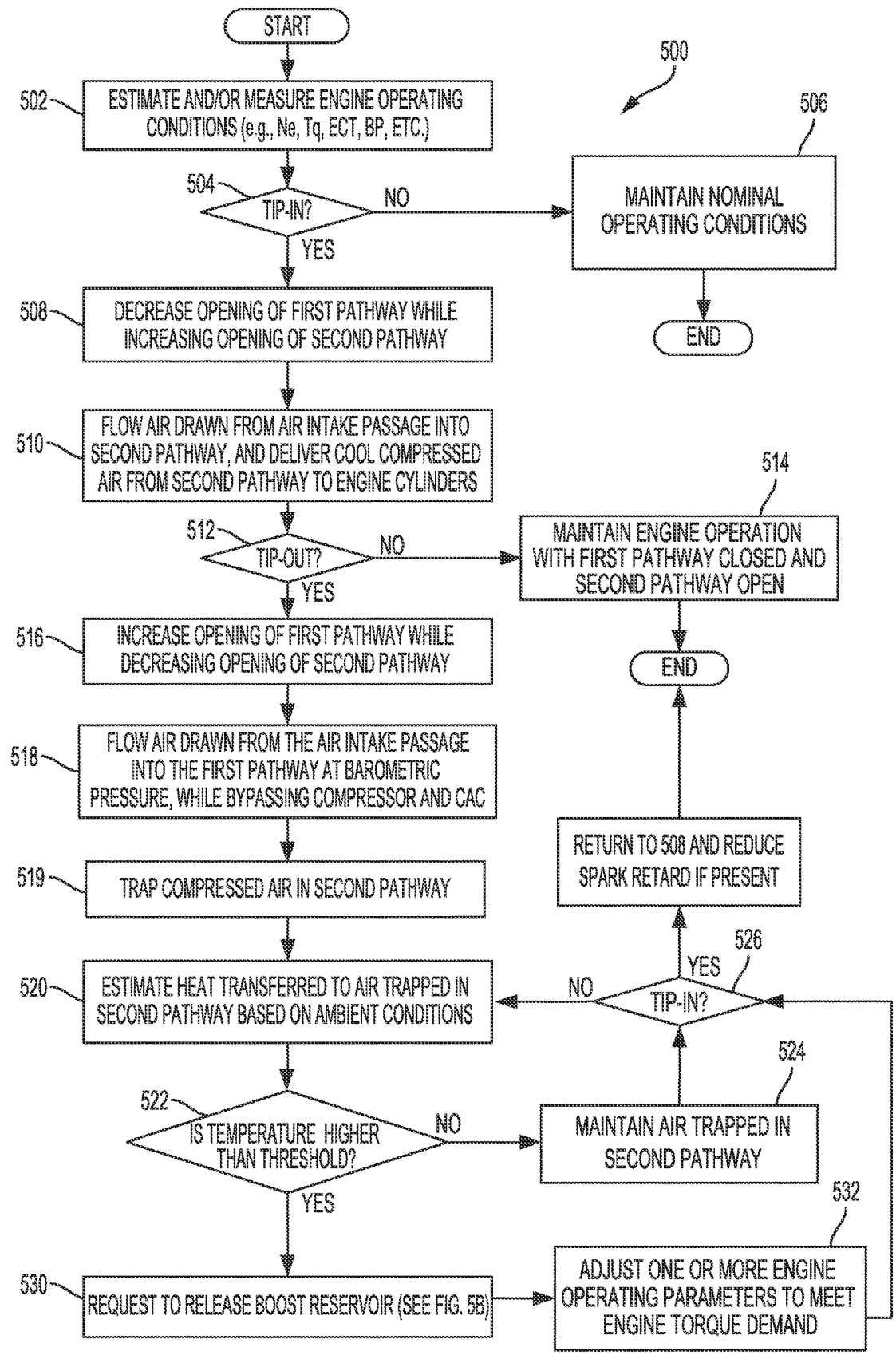
FIG. 5A shows a high level flow chart of an example method for controlling the operation of a pressurized air induction system.
Figure 5B:
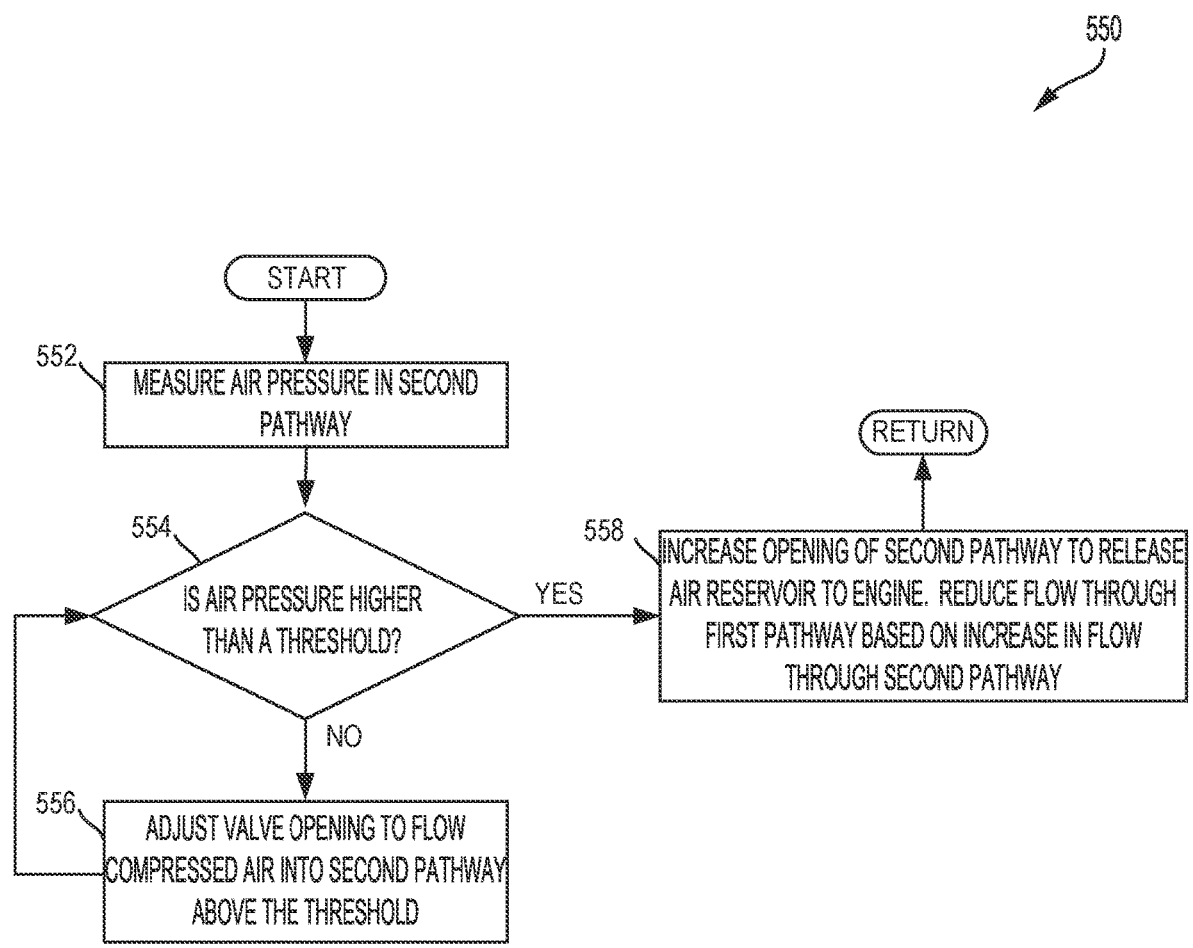
FIG. 5B shows a flow chart of an example subroutine of a method for controlling the operation of a pressurized air induction system.

Now turning to FIGS. 5A and 5B, example boosted engine methods 500 and 550 for supplying either ambient air or cooled, boosted air to an engine are described. Method 500 shows boosted air may be discharged from a reservoir of a two passage air induction system, such as the PAI system of FIGS. 1-2, in response to an increase in torque demand and engine operation in a higher engine speed-load region (such as following an operator pedal tip-in event) requesting additional engine torque and/or a tip-out (e.g. pedal released). By adjusting the air flow from a first passage and/or a second passage of the PAI system, cooled, boosted air may be stored in the PAI system and supplied to the engine as desired. While the air is stored in the PAI system, the boost reservoir air pressure may be replenished with a flow of compressed air from the secondary air source upon detection of the pressure dropping below a nominal threshold. This may maintain the boosting ability of the stored compressed air in the reservoir until engine load operating conditions increase demand for boosted air, e.g., above a torque demand level indicating increased torque, or a request to release the reservoir initiates a purge of the boosted air. The boost reservoir of the PAI system may be purged following the example routine 550. A request to release the boosted air reservoir received in the method 500 may be executed following a decision to increase the pressure of the reservoir above the nominal threshold, as described above with reference to FIGS. 2A and 2B. Instructions for carrying out method 500 and the rest of the methods included herein may be executed by a controller based on computer-readable instructions stored on a memory of the controller and in conjunction with signals received from sensors of the engine system, such as the sensors described above with reference to FIG. 1. The controller may employ engine actuators of the engine system to adjust engine operation, according to the methods described below.

At 502, the operating conditions of the engine may be estimated and/or measured. These may include, for example, engine speed and load, torque demand, engine coolant temperature, barometric pressure, ambient humidity, ambient temperature, boost reservoir pressure (e.g., air pressure in the second passage), MAP, MAF, etc. At 504, it may be determined if there is an increase in operator torque demand. For example, it may be determined whether an accelerator pedal tip-in is detected. In one example, accelerator pedal depression may be measured via a pedal position sensor. If no tip-in is detected, at 506, the method includes operating at nominal settings based on the estimated engine parameters.

In one example, where the engine is operating at low-mid speed-loads, operating at nominal conditions includes supplying fresh air to engine cylinders at ambient temperature, pressure, and humidity via the first passage of the PAI system while maintaining the second passage, that includes a compressor and a CAC, closed. This includes opening the first passage by actuating a first throttle disposed in the first passage proximal to an intake plenum coupled to an engine intake manifold to either a fully open position or partially open position. Partially opening the first throttle may comprise adjusting an opening of the first throttle to be a percentage of the opening when fully open. For example, the opening of the partially open first throttle may be 20%, 50%, 70%, or a percentage between 1%-99% relative to the opening of the first throttle when the first throttle is fully open. In one example, operating at nominal conditions may include maintaining the supply line, through which the second compressed air source may be supplied to the second passage, closed by adjusting the second air source valve to a fully closed position.

If a vehicle operator tip-in is detected, the method proceeds to 508 where the controller may send a signal to decrease flow through the first passage and increase flow through the second passage of the PAI system so that a larger portion of the air delivered to the engine intake is cooled, boosted air. The routine includes directing ambient air from an intake passage through the compressor of a turbocharger and then cooling the air through the CAC so that the air is cooled and compressed upon reaching the engine intake. In one example, where the PAI system has a first throttle coupled to a first passage and a second throttle coupled to a second passage, directing a larger portion of air to the engine as boosted air includes opening the second throttle and closing the first throttle. The degree of opening of the second throttle is based on an amount of torque requested, as inferred from the pedal position. The more the pedal is depressed, the greater the torque demanded, resulting in a higher degree of opening of the second throttle. The second throttle may open by a smaller amount when the pedal is slightly depressed or fully open when the pedal is depressed to a maximum. Concurrent with the opening of the second valve, the first valve opening is decreased as input from the pedal indicates increase in demand for boosted air. The first valve opening may decrease by a proportional degree to the amount the second valve is opened or the first valve may be fully closed to avoid potential change in pressure and/or temperature of the boosted air due to mixing with ambient air.

In another example, where the PAI system has a splitter valve disposed in a region where the first passage and second passage merge with a first flap arranged in the first passage and a second flap arranged in the second passage, operating at nominal conditions at 506, as described above, includes adjusting the splitter valve so that the second flap is perpendicular to the path of flow in the second passage. The second passage is thus closed and the first passage is open, delivering ambient air to the engine via the first passage of the PAI system.

In the event of a tip-in, the method at 508 directs a larger portion of air to the engine as boosted air. The splitter valve may be tilted so that the second flap forms an opening in the second passage that is larger than an opening formed by the first flap in the first passage. The angling of the splitter valve is based on an amount of torque requested, e.g. sensing of pedal position. The more the pedal is depressed, the greater the torque demanded, resulting in adjustment of the splitter valve so that the first flap is closer to perpendicular in the first passage than the second valve. The closer the first flap is to perpendicular, the smaller the opening in the first passage relative to the opening in the second passage. If a small depression in pedal position is detected, the splitter valve may tilt so that the first flap is slightly closer to perpendicular within the first passage than the second flap within the second passage. As a result, a smaller opening is formed in the first passage than the second passage. If the pedal is depressed to a maximum position, the first flap may be positioned exactly perpendicular so that the first passage is blocked and air delivered to the engine is entirely boosted air from the second passage.

At 510, air is drawn through the second passage from an intake passage, such as intake passage 142 of FIG. 2, pressurized by the compressor and then cooled upon passing through the CAC. At 512 the method may determine if a tip-out is detected, e.g., if the accelerator pedal is released as inferred by the pedal position sensor. If the tip out is not detected, engine operation continues to 514 with the second passage open and the first passage while torque demand remains elevated. If a tip-out is detected, the method proceeds to 516 where the controller may send a signal to increase flow through the first passage and decrease flow through the second passage of the PAI system so that a larger portion of the air delivered to the engine intake is ambient air.

In one example, where the PAI system has a first throttle coupled to a first passage and a second throttle coupled to a second passage, directing a larger portion of air to the engine as ambient air includes opening the first throttle and closing the second throttle. The degree of opening of the first throttle and closing of the second throttle is based on the torque demand. The more the pedal is released, e.g. less depressed, the lower the torque demand resulting in the further reduction of the opening of the second throttle. The lower torque demand, as inferred by pedal position and the consequent decrease in the opening of the second throttle results in an increase in the opening of the first throttle. When the pedal is fully released, the first throttle may be fully opened while the second throttle is fully closed.

In another example, where the PAI system has a splitter valve disposed in a region where the first passage and second passage merge with a first flap arranged in the first passage and a second flap arranged in the second passage. At 516, the splitter valve may be tilted so that the first flap forms an opening in the first passage that is larger than an opening formed by the second flap in the second passage. The angling of the splitter valve is based the decrease in torque demand, inferred by the pedal position. The less the pedal is depressed, the lower the torque demanded, resulting in adjustment of the splitter valve so that the second flap is closer to perpendicular in the second passage than the first valve. The closer the second flap is to perpendicular, the smaller the opening in the second passage relative to the opening in the first passage. If the pedal is released, for example, to a half-way depressed position, the splitter valve may tilt so that the second flap is slightly closer to perpendicular within the second passage than the first flap within the first passage. As a result, a smaller opening is formed in the second passage than the first passage. If the pedal fully released, the second flap may be positioned exactly perpendicular so that the second passage is blocked and air delivered to the engine is entirely ambient air from the first passage.

At 518, ambient air is flowed at barometric pressure to the engine intake, bypassing the compressor and CAC. While ambient air is drawn into the engine, flow through the second passage is blocked by closing the second throttle or second flap of the splitter valve. The air contained within the second passage is trapped at 519 between a PRV, such as PRV 164 of FIG. 2, at an upstream end and the second throttle or second flap at a downstream end of the second passage at 519. Within the closed second passage, the air trapped upstream of the CAC may be pressurized and at ambient temperature while the air trapped downstream of the CAC may be pressurized and cooled. At 520, the state of the stored boosted air in the second passage is estimated by inferring an amount of heat transferred to the stored air and calculating a rate of temperature rise.

For example, data from an ambient humidity sensor and an ambient temperature sensor, such as the sensors 230 and 232 of FIG. 2, may be sent to the controller to estimate the ambient humidity and ambient temperature of the trapped air. The data is used to calculate, based on information stored in the controller about conductivity of the material forming the walls of the second passage and the temperature differential between ambient air and trapped boosted air, the amount of heat transfer from the surrounding air external to the second passage into the trapped air. The heat transfer may be used to determine a temperature of the trapped air, which is compared to a pre-set non-zero temperature threshold. The threshold may be a temperature at or above which the boost potential of the trapped air is reduced to an extent that the boosted performance of the engine may be degraded if the trapped air is discharged. In addition to the temperature threshold, a time threshold may be used to evaluate the boost potential of the stored air, such as a time elapsed duration since the full closing of the second throttle, e.g., since the replenishment of the boost reservoir. Additionally or alternatively, a threshold duration of engine combustion cycles or miles traveled may be used to determine an increase in reservoir air temperature.

A rate of temperature rise, e.g., joules per second, of the trapped air may be inferred from the estimated heat transfer. The time threshold may be calculated based on a look-up table stored in a memory of the controller providing time thresholds as a function of ambient conditions and estimated rate of temperature rise. For example, low ambient temperatures or low ambient humidity may result in slower rates of temperature rise, a longer time threshold, and a longer period before the temperature of the trapped air reaches or exceeds the temperature threshold. Conversely, high ambient temperature or high ambient humidity may shorten the time threshold due to a faster expected rate of temperature rise. Both the pre-set temperature threshold as well as the time threshold may be used to evaluate the state of the trapped boosted air in the second passage of the PAI system.

At 522 of method 500, the inferred temperature of the stored air and the duration since the second passage was closed to trap the boosted air may be compared to the pre-set thresholds stored in the memory of the controller. If the estimated temperature is not above the temperature threshold or the duration of time does not exceed the calculated time threshold, air is maintained trapped within the second passage at 524. The method then determines if a tip-in is detected at 526. In the event that no tip-in is detected, the method returns to 520 and evaluates the state of the trapped air based on ambient temperature and humidity as described above, followed by comparison with pre-set thresholds at 522. Alternatively, if a tip-in is detected, the method returns to 508 where an opening of the first passage is decreased and an opening of the second passage is increased based on the pedal position detected and inferred demand for torque. Ambient air is delivered to the engine while flow of boosted air is minimized or blocked.

Returning to 522 of method 500, if the heat transfer exceeds the threshold, the method proceeds to 530. At 530, a request to release the boost reservoir directs the method to subroutine 550 of FIG. 5B, where the boost reservoir may be pre-filled with compressed air prior to reservoir release, based on a pressure level. Following the discharge of the stored air in the reservoir, the method 550 may return to the method 500.

At 532, one or more engine actuators may be adjusted if decreasing the flow from the first passage does not sufficiently compensate for the boost provided by the warmed boosted air. If a torque transient is expected, other engine operating parameters may also be varied. For example, further instructions for varying engine operating parameters may include retarding the spark timing, modifying the fuel injection and valve timings, or adjusting the ratio of fuel delivered via direct injection versus port injection. By altering engine operations in response to excessive boost relative to engine load, misfiring at a plurality of cylinders of the engine may be avoided.

In one example, the degree to which spark timing is delayed is based on a difference between the amount of torque requested and an amount of torque supplied. Upon discharging warmed, boosted air to the engine through the second passage with flow from the first passage reduced, the boosted air may still provide boost pressure to the engine beyond the requested amount inferred by the pedal position. In one example, while torque remains low, pre-filling the reservoir with compressed air prior to the release of warmed boosted air may provide boost pressure substantially beyond the requested amount. As a result, spark may be retarded from maximum brake torque (MBT) to avoid engine knock. For example the greater the discrepancy between the requested boost and the provided boost, where the provided boost is too high, the longer the spark timing may be delayed to allow the pressure in a combustion chamber of the engine to dissipate by an amount before ignition. In other words, the boost pressure of the reservoir and the rate of the reservoir release may affect the degree by which spark timing passage is retarded from MBT. When the supply of torque decreases to match the torque demand, spark timing then returns MBT.

Following the adjustment of engine operating parameters, the method returns to 526 to determine if a tip-in is detected. If no tip-in is detected, the method returns to 520 and evaluates the state of the trapped air based on ambient temperature and humidity as described above, followed by comparison with pre-set thresholds at 522. In an example, while torque demand remains low, e.g., less a torque demand threshold, the boost reservoir may be continuously evaluated, pre-filled via the second compressed air source, and discharged, as described above, maintaining a reservoir of compressed air ready in the event of a high torque request. Alternatively, if a tip-in is detected, the method returns to 508 where an opening of the first passage is decreased and an opening of the second passage is increased based on the pedal position detected and inferred demand for torque. Thus, subsequent to initial startup, boosted air may be readily supplied to the engine upon detection of a tip-in by discharging stored boosted air through the second passage and decreasing flow through the first passage. During a tip-in, due to the on-demand compressed air, a torque request may be provided immediately, improving engine turbocharger response time. In the event of a tip-out, the second passage is bypassed, providing a shortened delivery path of ambient air to the engine, thereby avoiding the unnecessary use of boosted air. During the tip-out, if the temperature of the stored air surpasses a temperature threshold or a period of time elapses that exceeds a time threshold that renders the stored air less effective for providing boost, the stored air is released.

Referring now to FIG. 5B, a method for releasing compressed air from a boost reservoir of a PAI system based on a pressure level is illustrated. In one embodiment, the method 550 may be a subroutine of the method 500 depicted in FIG. 5A. In one example, the method 550 may be executed following a request to release the air from the boost reservoir in response to increased temperature of the stored air described in method 500. In one example, the method 550 may be carried out in a PAI system of a vehicle, such as the PAI system 250 of FIG. 2B and the vehicle 5 of FIG. 1.

At 552, the method 550 includes measuring the air pressure in the second passage, e.g., the boost reservoir. In an example, a sensor, e.g., sensor 244 of FIGS. 2A and 2B, may measure the air pressure in the second passage, e.g., second passage 206 of FIGS. 2A and 2B. The pressure reading, e.g., an absolute value, may be signaled to a controller, e.g., controller 12.

At 554, the method 550 includes comparing the air pressure in the second passage to a threshold pressure. In one example, the threshold pressure may be fixed value. In one example, the threshold pressure may be calibratable. The threshold pressure may be based on one or more operating conditions, e.g., ambient conditions, engine system conditions. In one example, a threshold pressure may be based on an estimated rate of pressure loss in the second passage when the boost reservoir is discharged.

If the air pressure in the second passage is not higher than a threshold pressure, the method continues to 556. At 556, a valve controlling the air flow from the second compressed air source (e.g., valve 242 of FIGS. 2A-2B) may be adjusted to flow compressed air into the second passage. In an example, the valve opening may be set to flow compressed air based on an estimate of time to raise the air pressure above the threshold pressure. In another example, the valve may remain open until the controller signals that a threshold pressure has been reached, e.g., signaled by the pressure sensor.

Returning to 554, if air pressure in the second passage is higher than a threshold pressure the method continues to 558. At 558, the second passage is opened to allow the warmed boosted air to be discharged to the engine intake manifold. The release of warmed boosted air, however, in addition to the air delivered to the engine intake manifold via first passage may result in boosting the engine above a desired level of torque. Consequently, the controller may send a signal to reduce the flow of ambient air from the first passage.

In one example, where the PAI system has a first throttle coupled to a first passage and a second throttle coupled to a second passage, opening the second passage to discharge the stored boosted air includes opening the second throttle and closing the first throttle. The degree of opening of the second throttle and closing of the first throttle, e.g., the desired air flow, is based on the amount of torque requested, as inferred from pedal position. For example, if the pedal is slightly depressed, the first throttle may be fully closed and the second throttle partially opened to prevent the engine from becoming overloaded. If the pedal is halfway depressed, the opening of first throttle may be reduced but still partially opened while the second throttle is partially opened to vent the stored air.

In another example, where the PAI system has a splitter valve disposed in a region where the first passage and second passage merge with a first flap arranged in the first passage and a second flap arranged in the second passage, opening the second passage to discharge the stored boosted air includes tilting the splitter valve so that an opening in the second path formed by the second flap is increased while simultaneously reducing the opening in the first passage formed by the first flap. The angling of the splitter valve is based on the amount of torque requested, as inferred from pedal position. For example, if the pedal is slightly depressed, the splitter valve may tilt so that the opening in the second passage is smaller than the first passage. If the pedal is halfway depressed, the splitter valve may be adjusted so that the openings in the first passage and second passage are approximately equal.

From 558, the method 550 may return to the method 500.

In one example, only in response to a request to purge the stored air in the reservoir may the pressure of the reservoir may be increased beyond the nominal threshold when operating conditions include decreased engine load. After the increasing of the reservoir pressure, the purging of the stored air to the engine intake may bring pressure back down toward the nominal threshold. In an example, if a vehicle operator tip-in occurs during the increasing of the pressure beyond the nominal threshold, the method may include simultaneously supplying stored compressed air to the engine while replenishing the air.

In one example, during the storage of the compressed air, e.g., low engine load operating conditions, the reservoir air pressure may maintained for supply to the engine during increased engine load operating conditions by a replenishment of compressed air via the second air compressor in response to the pressure dropping below a nominal threshold. For example, while engine load is low, the pressure sensor may detect pressure in the reservoir dipping below a pressure threshold. The controller may actuate an opening of the second air source valve to allow a flow of compressed air into the reservoir. In this way, the pressure of the reservoir may be maintained at the nominal pressure and at low engine loads.

Example operations of a PAI system are now discussed with reference to FIG. 6. In the timeline, a first scenario and a second scenario are depicted. First, based on a request for engine torque and on heat exchange to the stored boosted air in the PAI system, ambient air flow through a first passage and boosted air flow through a second passage are adjusted without supplementation by a second compressed air source. A second scenario shows air flow through the first and second passages adjusted with supplementation from the second compressed air source. In the example timeline 600, an embodiment of the system of FIG. 4AB is depicted. Alternatively, an embodiment of the system of FIGS. 3A and 3B could be used.

Figure 6:
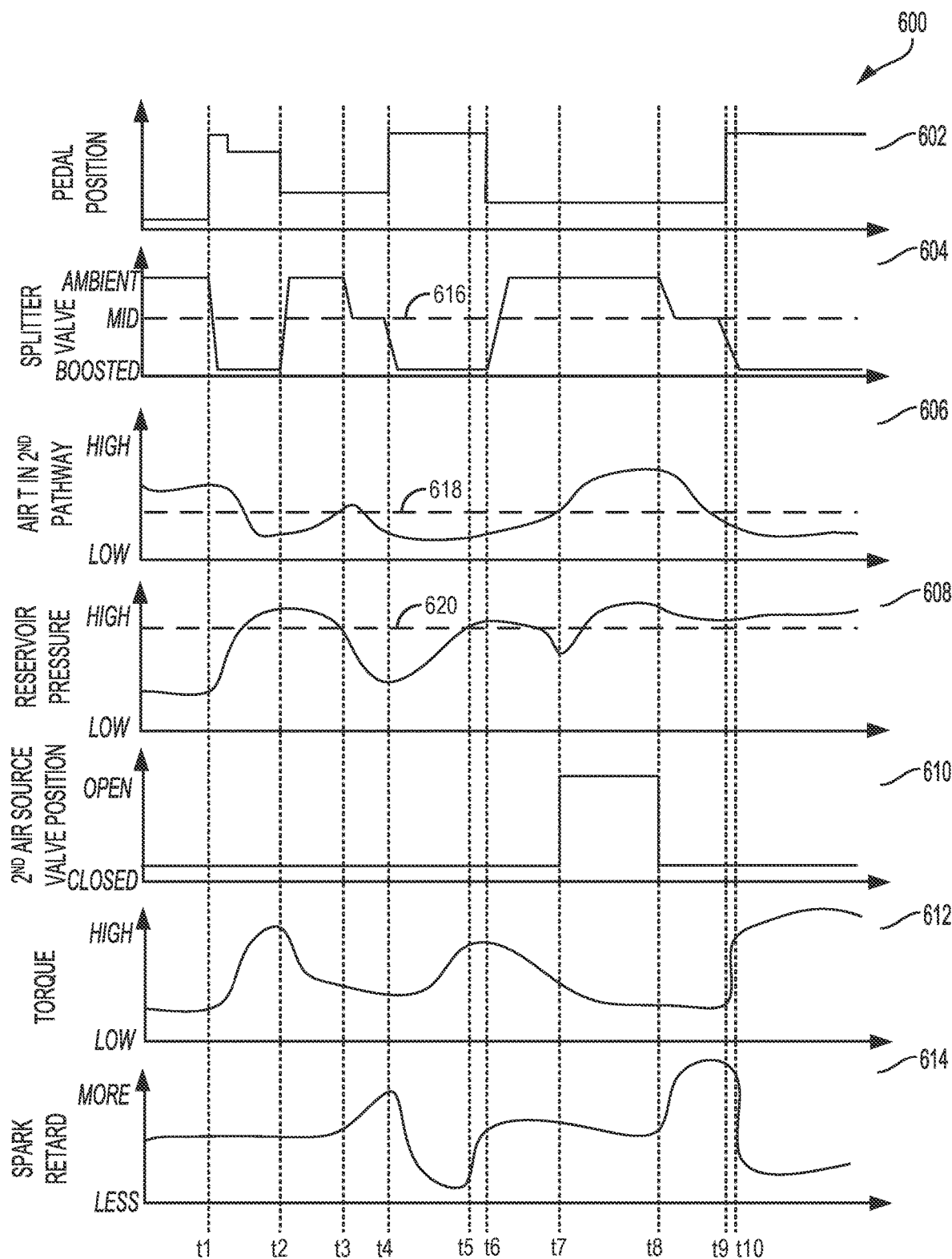
FIG. 6 shows an example operation of the pressurized air induction system to improve boosted engine performance, according to the present disclosure.

FIG. 6 shows an example prophetic operation of a PAI system adapted with a splitter valve, for example, the splitter valve 401 of FIG. 4A-B, for controlling flow of boosted air.

As elaborated in map 600, a tip-in or tip-out is detected by a pedal position, depicted at graph 602. The position of the V-shaped valve of the splitter valve is indicated at graph 604. The V-shaped valve may be pivoted so that more ambient air, from the first passage, is delivered to the engine than boosted air, from the second passage, or adjusted so that more boosted air is delivered than ambient air. A middle position where the air flow to the engine comprising equal portions of ambient air from the first passage and boosted air from the second passage is represented by a dashed line 616. The V-shaped valve may also be positioned so that air flows exclusively from the first passage or the second passage. The temperature of the boosted air in the second passage is illustrated at graph 606 and the pressure of the boosted air reservoir is shown at graph 608. The position of the valve for controlling the flow of the second air source, for example, the second air source valve 242 of FIGS. 2A and 2B, is shown at graph 610. The engine torque is shown at graph 612. The spark timing is depicted at graph 614 as a function of the operating conditions shown.

Prior to t1 the engine is operating at low speed with the splitter valve angled so that a first flap in the first passage forms an opening, enabling the flow of fresh air through the first passage to the engine. A second flap of the splitter valve is positioned perpendicular in the second passage, blocking flow from the second passage into the engine since boost air is not required. The CAC is not operating and the air temperature within the second passage is close to ambient temperature and above a pre-set, non-zero temperature threshold 618. The boost reservoir pressure, as a result of the low torque demand, is also low and the spark timing is at or around MBT.

At t1, a tip-in is detected as indicated by a depression of an accelerator pedal. The tip-in activates the adjustment of the air flow to the engine: the first flap is perpendicular, blocking flow through the first passage and the second passage is open. As air flows through the second passage, the air is continually cooled, resulting in a gradual decrease in the air temperature of the second passage. The boost pressure in the second passage increases to meet the request for increased torque while the spark timing remains at MBT. The pressure increases above a pre-set, non-zero pressure threshold A tip-out, detected by reduced depression of the pedal, occurs at t2. Responsive to the tip-out, the splitter valve is tilted so that the first passage is opened and the second passage is closed, alternating the air supply to the engine to flow fresh air instead of boosted air. As a result of the closing of the second passage, boosted air is stored in the second passage. Between t2 and t3, the stored air gradually warms due to heat transfer between ambient air surrounding the second passage and the air stored within the second passage. Boost pressure of the reservoir remains relatively constant until t3 when the temperature of the second passage exceeds the temperature threshold 618.

The threshold may be a value above which the boost provided by the air is degraded. In addition, a time threshold may elapse by t3 that is based on a rate of temperature rise calculated from inferred heat transfer and determines when the temperature of the stored air exceeds the temperature threshold 618. Responsive to the detected surpassing of the temperature and time thresholds described above, a gradual adjustment of the position of the splitter valve is performed. Opening of the second passage is increased while flow through the first passage is decreased, causing an undesired increase in torque. Thus, the splitter valve is adjusted so that the opening in the first passage is larger than the opening in the second passage to regulate the amount of additional air delivered to the engine. For example, the splitter valve may be angled so that 80% of the air flow to the engine is ambient air from the first passage while 20% of the air flow is boosted air from the second passage. As shown in map 700 by graphs 704 and 706, the splitter valve position is biased towards the first passage immediately after t3 and is gradually adjusted towards the middle position, indicated by dashed line 616 with the first passage slightly more open than the second passage until t4.

The adjustment of the splitter valve may not be able to fully compensate for the increase in air flow to the engine via the second passage. As a result, a torque transient may occur with excess torque being produced. To address this, one or more engine operating parameters may be adjusted. For example, spark timing may be retarded from MBT. At t3, spark timing is retarded further from MBT as the flow through the second passage is increased. A concurrent decrease in reservoir pressure, below the pressure threshold 620, is observed as the boosted air is released from the second passage to the engine while the air temperature in the second passage remains relatively constant and above the temperature threshold 618.

At t4, a second tip-in is detected interrupting the discharge of the reservoir. The splitter valve is angled so that first passage is closed as the second passage is fully opened to supply air from the second passage. The reservoir pressure is well below the pressure threshold 620, the reservoir having been discharged prior to t4. Spark retard is substantially reduced to compensate for the depleted boost pressure but insufficient to meet the torque request. A lag in torque response to the tip-in is observed between t4 and t5.

As the timeline approaches t5, air flows through the compressor and CAC operation in the second passage is enabled. The AIS system is supplying cooled and boosted air at t5. The reservoir pressure responds by rising above the pressure threshold 620 and the temperature of the boosted air in the second passage remains below the threshold 618. Reduced spark retard is increased in the direction of MBT in response to the boost pressure meeting the torque request. The distance between the dashed line of t4 and dashed line of t5 indicates turbo lag before the turbocharger spools sufficiently to increase the reservoir pressure to maximum boost following the tip-in at t4. A second tip-out, detected by reduced depression of the pedal, occurs at t6. Responsive to the tip-out, the splitter valve is tilted so that the first passage is opened and the second passage is closed, alternating the air supply to the engine to flow fresh air instead of boosted air. As a result of the closing of the second passage, boosted air is stored in the second passage. Between t6 and t7, the stored air gradually warms due to heat transfer between ambient air surrounding the second passage and the air stored within the second passage. Boost pressure of the reservoir remains relatively constant until t7 when the temperature of the stored air exceeds the temperature threshold 618.

At t7, a second scenario contrasting with the scenario at t4 begins. At t7, temperature detected in the second air passage in excess of the temperature threshold 618 signals to the controller to request the release of the reservoir. The release request initiates a reservoir air pressure measurement. The reservoir pressure is below the pressure threshold 620 and the valve to the second air source opens to flow compressed air into the reservoir. The second air source pre-fills the reservoir between t7 and t8.

At t8, the pressure of the reservoir exceeds the pressure threshold. Responsive to the detected exceeding of the air pressure threshold, the release request is fulfilled. The splitter valve position is gradually adjusted to increase the opening of the second passage while flow through the first passage is decreased. As shown in map 600 by graph 604, the splitter valve position is biased towards the first passage immediately after t8, is adjusted towards the middle position, indicated by dashed line 616, and biased towards the second passage as the timeline approaches t9.

The warmed boosted air is released from the reservoir between t8 and t9. Air temperature decreases below the temperature threshold 618. To compensate for the release of warmed boosted air to the engine while torque demand remains low, spark timing is retarded from MBT. The reservoir pressure dips slightly and remains above the pressure threshold due to the pre-filling of compressed air from the second air source prior to reservoir release.

At t9, a tip-in is detected interrupting the discharge of the reservoir. The splitter valve is angled so that first passage is closed as the second passage is fully opened to supply air from the second passage. Spark retard is substantially reduced to compensate for the increase in torque request. The reservoir pressure is above the pressure threshold 620 supplying air on-demand to meet the torque request. Turbo lag following the tip-in at t9, e.g., t9 to t10, is shorter than turbo lag following the tip-in at t4, e.g., t4 to t5. This shows a faster response to a torque demand interrupting the boost reservoir release by pre-filling the boost reservoir. After t10, spark timing returns to MBT as air supply to the engine is now appropriate relative to the torque demand.

In this way, boosted air may be stored and maintained in a PAI system so that boost is readily available during an increase in torque demand. By discharging the stored air during a tip-in while a compressor spools up, turbo lag is reduced. By including an air passage that bypasses a compressor and CAC, ambient air can be rapidly provided to the engine at low loads. By including an external source of compressed air in the PAI system and replenishing the air in response to pressure dropping below a nominal threshold, the boosting ability of the air may be maintained. When the stored air is warmed above a threshold and has lower boosting ability, the stored air can be pre-filled to increase the air pressure above the nominal level, to maintain the boosting ability of the air in the event a torque increase request immediately follows or occurs during a refilling event. The technical effect of including a second compressed air source with a PAI system of an engine is that turbo lag is minimized when higher engine torque is requested by maintaining the pressure of boosted air in the ducting.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
   via a controller, storing compressed air in a reservoir for supply to the boosted engine during increased engine load operating conditions and replenishing the air to the reservoir via a compressor in response to a pressure dropping below a nominal threshold; and
   increasing the pressure beyond the nominal threshold in response to increased temperature of the stored air in the reservoir even when operating conditions include decreased engine load, and purging the increased temperature stored air to an engine air intake to bring the pressure back down toward the nominal threshold.

2. The method of claim 1, wherein increasing the pressure includes supplying the compressed air from an air suspension system.

3. The method of claim 1, wherein increasing the pressure includes supplying the compressed air from an air compressor separate from an engine turbocharger compressor.

4. The method of claim 1, further comprising, in response to a vehicle operator tip-in during the increasing of the pressure beyond the nominal threshold, simultaneously supplying stored compressed air to the engine while replenishing the air.

5. The method of claim 1, further comprising retarding engine spark timing during pursing of the increased temperature stored air.

6. The method of claim 1, wherein the reservoir includes a passage of a two passage air induction system, the passage including a first compressor and a charge air cooler, and the air supplied to the engine adjusted via a throttle.

7. A boosted engine method, comprising:
   via a controller, storing compressed air in a reservoir;
   supplying the stored compressed air from the reservoir to the engine during increased engine load operating conditions;

replenishing the stored compressed air to the reservoir in response to a pressure of the stored compressed air in the reservoir dropping below a nominal threshold to maintain the pressure at the nominal pressure;

only in response to a request to purge the stored air in the reservoir, increasing the pressure beyond the nominal threshold even when operating conditions include decreased engine load; and only after increasing the pressure beyond the nominal threshold, purging the stored air to an engine intake to bring the pressure back down toward the nominal threshold.

8. The method of claim 7, wherein increasing the pressure includes supplying the compressed air from an air suspension system.

9. The method of claim 7, wherein increasing the pressure includes supplying the compressed air from an air compressor separate from an engine turbocharger compressor.

10. The method of claim 7, further comprising, in response to a vehicle operator tip-in during the increasing of the pressure beyond the nominal threshold, simultaneously supplying stored compressed air to the engine while replenishing the air.

11. The method of claim 10, further comprising retarding engine spark timing during purging of the increased temperature stored air.

12. The method of claim 7, wherein the request to purge is generated responsive to temperature of the stored air.

13. The method of claim 7, wherein the request to purge is generated responsive to an amount of heat transfer to the stored air.

14. The method of claim 7, wherein the reservoir includes a passage of a two passage air induction system, the passage including a first compressor and a charge air cooler, and the air supplied to the engine adjusted via a throttle.

15. The method of claim 13, further comprising estimating the amount of heat transferred based on ambient conditions including ambient temperature and humidity.

16. A boosted engine system, comprising:
an engine;
a first air intake passage coupled to the engine via a first throttle;
a second air intake passage housing a pressure relief valve, a first compressor located downstream of the valve, and a charge air cooler located downstream of the first compressor, the second air intake passage coupled to the engine via a second throttle, the first air intake passage coupled to the second air intake passage upstream of the pressure relief valve;
a supply line housing a valve located downstream of the first compressor, the supply line directly coupled to a second compressor or coupled via one or more intervening lines;
a pressure sensor coupled to the second passage downstream from the supply line;
an ambient temperature sensor and an ambient humidity sensor coupled to the first air intake passage;
an accelerator pedal for receiving an operator torque demand; and
a controller with computer-readable instructions stored on non-transitory memory for:
adjusting an opening of the first throttle relative to the second throttle based on the operator torque demand to deliver desired air flow to the engine and maintain pressure of compressed air in the second air intake passage at a nominal pressure; and
adjusting an opening of the first throttle relative to the second throttle based independent of the operator torque demand based on a rate of rise in temperature of the compressed air trapped in the second air intake passage to increase the pressure above the nominal pressure, and then purging the second air intake passage to return the pressure to the nominal pressure.

17. The system of claim 16, wherein the controller includes further instructions for:
estimating the rate of rise in temperature of the compressed air trapped in the second air intake passage based on each of measured ambient temperature, measured ambient humidity, initial temperature of the compressed air at a time of fully closing the second throttle, and a duration elapsed since the full closing of the second throttle, the amount of heat transferred increased as one or more of the ambient temperature increases, the ambient humidity decreases, the initial temperature increases, and the elapsed duration increases.

18. The system of claim 16, wherein the controller includes further instructions for:
adjusting spark timing from MBT while transiently opening the second throttle.

* * * * *